United States Patent

Williams et al.

[11] Patent Number: 5,845,283
[45] Date of Patent: Dec. 1, 1998

[54] METHOD AND APPARATUS FOR RATIONALIZING DIFFERENT DATA FORMATS IN A DATA MANAGEMENT SYSTEM

[75] Inventors: Dale L. Williams, Great Falls; Michael E. Peterson, McLean, both of Va.

[73] Assignee: Lingua Teq, Inc., McLean, Va.

[21] Appl. No.: 639,073

[22] Filed: Apr. 24, 1996

[51] Int. Cl.$^6$ .................................................. G06F 17/30
[52] U.S. Cl. .......................... 707/101; 707/1; 707/2; 707/102
[58] Field of Search ................... 370/420, 60.1; 395/500, 600, 2.79; 707/1, 2, 101, 102

[56] References Cited

U.S. PATENT DOCUMENTS

| | | | |
|---|---|---|---|
| 5,119,465 | 6/1992 | Jack et al. ................................ | 395/500 |
| 5,453,980 | 9/1995 | Van Engelshoven ................... | 370/60.1 |
| 5,497,491 | 3/1996 | Mitchell et al. ........................ | 395/683 |
| 5,519,808 | 5/1996 | Benton, Jr. et al. .................... | 395/2.79 |
| 5,530,852 | 6/1996 | Meske, Jr. et al. ..................... | 395/600 |
| 5,627,997 | 5/1997 | Pearson et al. ......................... | 395/500 |
| 5,666,362 | 9/1997 | Chen et al. .............................. | 370/420 |

FOREIGN PATENT DOCUMENTS

WO 93/23817  11/1993  WIPO .

OTHER PUBLICATIONS

Generic Database Interface, No. 318, Oct. 1, 1990, p. 794.
International Search Report, PCT US97/06183, no date.

*Primary Examiner*—Thomas G. Black
*Assistant Examiner*—Cheryl Lewis

[57] ABSTRACT

A data conversion device, including a preferably software implemented data conversion engine, which receives a formatted input data stream from an input device, converts the data into a different (universal) format in real time and transmits the converted data to an output device. Messages, i.e., data, from host devices can also be uplinked, via the data conversion device, to the data generating devices. By rapidly processing new and/or incompatible data record formats the invention minimizes the cost of maintaining data management systems and maximizes their usage. The conversion device input and output architecture is flexible and the conversion device can be used with multiple (networked or non-networked) data generating devices and single or multiple data storage devices using multiple data output formats.

26 Claims, 6 Drawing Sheets

METHOD AND APPARATUS FOR RATIONALIZING DIFFERENT DATA FORMATS IN A DATA MANAGEMENT SYSTEM

FIELD OF THE INVENTION

The present invention relates to a method and apparatus for rationalizing and/or routing data being sent from various data generating devices and/or devices using diverse data formats, protocols and the like, and destined for further processing. More specifically, the present invention relates to a method and apparatus for eliminating the need to modify a record processing system each time a new data input device, data file, or data processing method is introduced. Still more specifically, the present invention relates to a method and device for generating desired data outputs in a desired format irrespective the data format or protocols of the data input device used.

BACKGROUND

Figure 1:
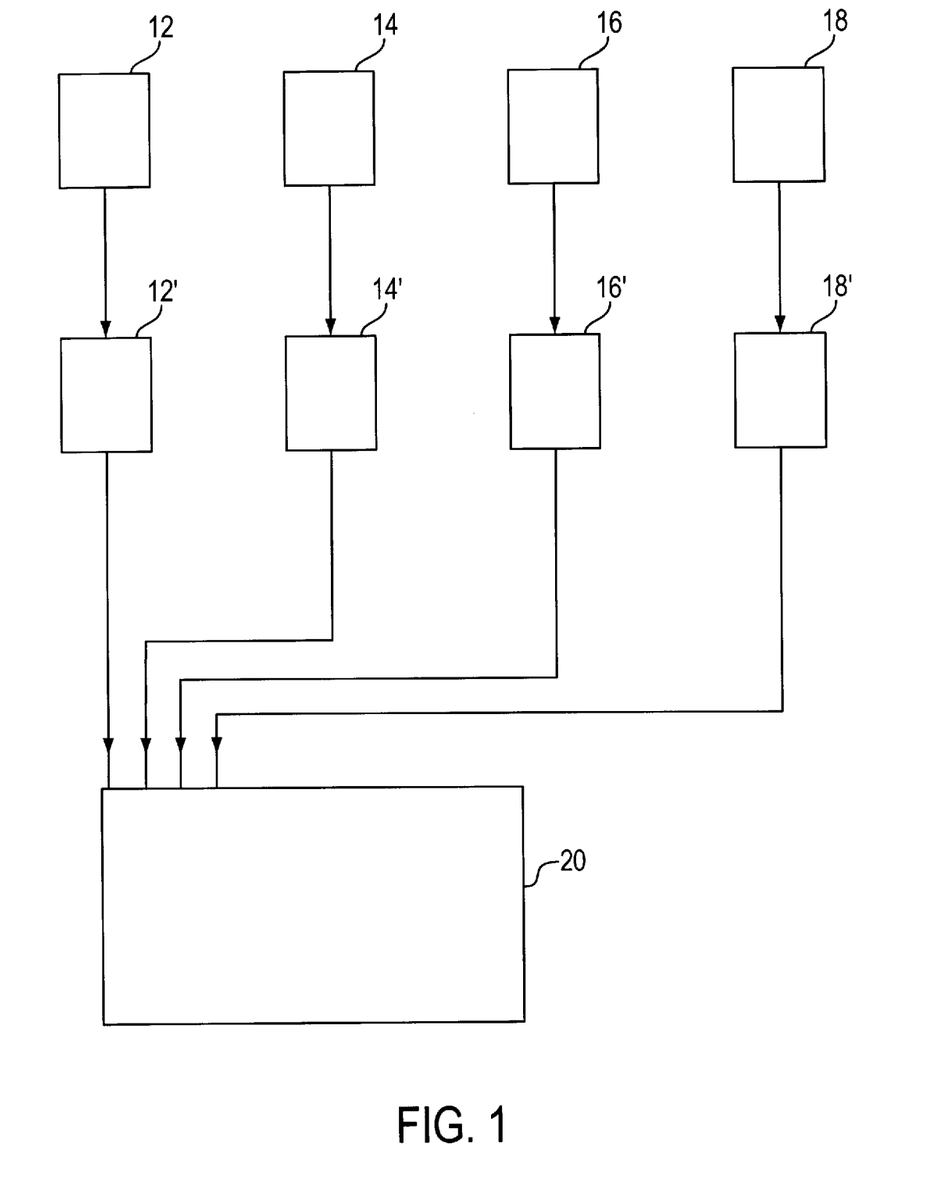
FIG. 1 is a depiction of a prior art data management system utilizing custom designed interface devices for each type of input data generating device used.

The complexity and effort required to manipulate the unique data streams generated by present data input devices has caused system developers to develop unique (in the sense of customized) systems and processes for each data source. Current data gathering and processing systems frequently receive data from several input devices, many of which may use different data formats. In order to be able to manipulate data from these diverse sources, this computing environment requires that a custom interface exist between each input device and the data processing system. FIG. 1 depicts a typical current operating environment for an exemplary telecom billing system.

In the example illustrated in FIG. 1 each input device or data generator 12, 14, 16, 18 requires a custom interface 12', 14', 16', 18', respectively to input data to the data processing host computer 20. A typical system may, for example, involve processing transaction information in a telecom environment. Assume for example that a telecom customer initially subscribes only to telephone service. Each transaction event, i.e. telephone call, triggers a stream of transaction data in a specified format to be processed. If, over time, that customer adds cable TV to its service, a new and usually differently formatted data stream is generated each time a transaction event occurs. If still later, that customer adds a pager and a fax machine to its service, additional new and again differently formatted data streams are generated for each transaction originating from those sources. All of these situations create potential problems of communication and data interoperability.

Vendor generated problems, i.e., communications interoperability, are usually addressed by means of protocol convertors or open end standards. However, each time a new device or service is added (e.g., caller ID, call waiting, voice mail), a new, usually custom designed data interface must also be designed in order to support that device or service. As more new telecom services, such as multiway pagers, home (electronic) banking, personal (Internet) home pages, and E-mail proliferate, and as industries such as the telecom industry experience consolidation events where different corporate entities using different transaction data formats or protocols merge and/or acquire each other, the problem of rationalizing data collection and data processing will, based on current technology, become more complex and severe.

The standard conventional solution, that of modifying or recreating an entire accounting or billing system to support that new service or device or creating a patchwork of customized billing protocols become less tenable and less satisfactory as options. Also, for specialized data streams (such as corporate transactions) industry wide standards are not a viable option as data structures are often a vital part of a company's proprietary data processing operations.

OBJECTS AND SUMMARY OF THE INVENTION

It is an object of the present invention to provide a method and apparatus for converting data from one format or protocol into a desired format or protocol regardless of the format or protocol in which it was generated.

It is a further object of the invention to provide a method and apparatus for converting one or more input data formats into a common, universal data format.

It is yet a further object of the invention to provide a method and apparatus for converting data from a universal data format to one or more predetermined output formats.

It is yet a further object of the invention to provide a method and apparatus compatible with existing data processing systems to "translate" between multiple data formats.

It is still a further object of the invention to provide a method and apparatus which can be readily integrated into existing data processing systems and can instantly adopt such systems to process and output appropriately formatted data as new products and/or services are introduced.

It is yet a further object of the invention to provide a method and apparatus which will manage communication protocols between a data generator and data processing host, which can be deployed centrally (i.e., at the data processing host) or remotely (i.e., at the data generator).

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the invention, as embodied and broadly described herein, the method and apparatus of this invention may comprise an information retrieval and storage system which comprises: a data generating device for generating data of a predetermined formats; a data conversion device for receiving data from the data generating device, converting the data into a universal format, and from the universal format into a desired output format; and a host device for receiving data in the output format. The system preferably includes a plurality of data generating devices, each connected to the data conversion device; the plurality of data generating devices may be either networked or stand alone, and if networked, the data conversion device would include a network interface. The data conversion device preferably comprises at least two input data interface devices, each for supporting a different predetermined input data format, where each of the input data interface devices converts the input data streams into a universal data format. The data conversion device will preferably further comprises at least one output interface device operable to convert data from the universal data format into a predetermined out data format.

In another aspect of the invention, there is provided data conversion device for receiving data in different formats form a plurality of data generating devices. The data conversion device comprises at least one input data interface for receiving an incoming data stream, the input interface supporting a predetermined input data format; a data conversion engine for receiving input data form the input data interface and converting the data into a predetermined universal data format; and at least one output data interface for receiving data in the universal data format and output data interface for receiving data in the universal data format and outputting it in a predetermined output data format. The data conversion device preferably operates in real-time and the data conversion engine preferably includes a first storage device for temporary storage of data streams during conversion and a library of conversion rules for converting input data streams form one or more input data formats into the universal data format and from the universal data format into one or more output data formats.

In yet another aspect, the invention comprises a method of processing data streams from one or more input data formats into one or more output data formats using a data conversion device, the method comprises the steps of:

receiving a data stream containing data organized in a first data format;

converting the data stream in a first interface device into a universal data format:

converting the data stream in a second interface device from the universal data format into a desired output data format;

transmitting the data stream in said output format to a data processing device.

BRIEF DESCRIPTION OF THE DRAWINGS

The accompanying drawings, which are incorporated in and form a part of the specification, illustrate the presently preferred embodiments of the present invention, and, together with the description, serve to explain the principles of the invention. In the drawings.

DETAILED DESCRIPTION OF THE INVENTION

Reference will now be made in detail to the presently preferred embodiments of the invention, examples of which are illustrated in the accompanying drawings. In the various drawings, the same reference numerals have been used to refer to corresponding devices or elements.

Turning first to FIG. 1, in a typical prior art business system, such as that illustrated in FIG. 1, data may be received from several different input devices, for example a cellular telephone, 12, a cable TV, 14, a modem, 16, and facsimile machine, 18, each of which generates data in a different format. As will be apparent to the artisian, the data generating devices may also be various point of sale terminals or virtually any type of device which generates a data stream for further processing. In such an environment, specially designed, custom interface devices 12', 14', 16' and 18' must be created for use between the respective data generating devices, 12, 14, 16 and 18 and the host data processing computer 20. This not only increases cost and decreases efficiency, it results in the need to constantly redesign data formats, and design new custom interfaces, i.e., as new services are offered by the business involved or new data formats are introduced.

Figure 2A:
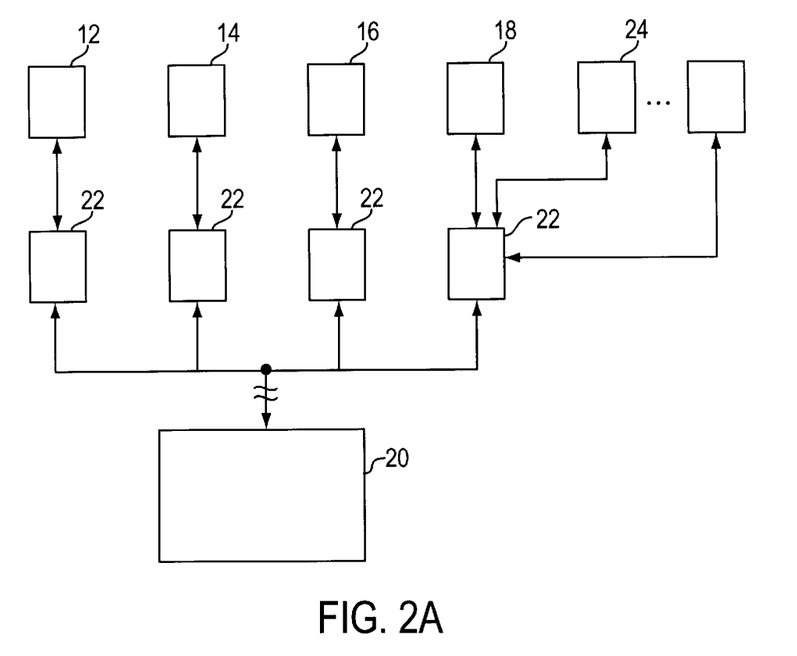
FIG. 2A is a depiction of a data management system incorporating a data conversion device according to the present invention for each data generating device.

FIG. 2A depicts an exemplary system according to the present invention in which, like the system of FIG. 1, data in different data formats is generated by several different data generating devices, 12, 14, 16 and 18. However, the system of FIG. 2A uses a conversion device 22 according to the present invention which eliminates the need to modify the system each time a new input device, service or the like which was a new or different data stream is introduced. In the system of FIG. 2A, the data conversion device 22 receives formatted data from an input device (i.e., a data generator) and ultimately converts that data into a desired format which may then be transmitted or otherwise distributed to an the host/data processing device(s) 20. Businesses such as those specializing in global telecommunications, credit card processing, electric utility service, and cable television can advantageously use a data conversion device 22 based system to quickly accommodate new business services. By rapidly processing new or incompatible transaction record formats, the data conversion device 22 will minimize the cost of maintaining existing business systems while maximizing the effective usage of those systems.

FIG. 2A is an example of a system in which the data conversion device 22 is deployed remotely, i.e., at the data generator, or in proximity to two or more data generators. The data conversion devices 22 may be connected directly to the host data processing device or may be connected by a network.

Figure 2B:
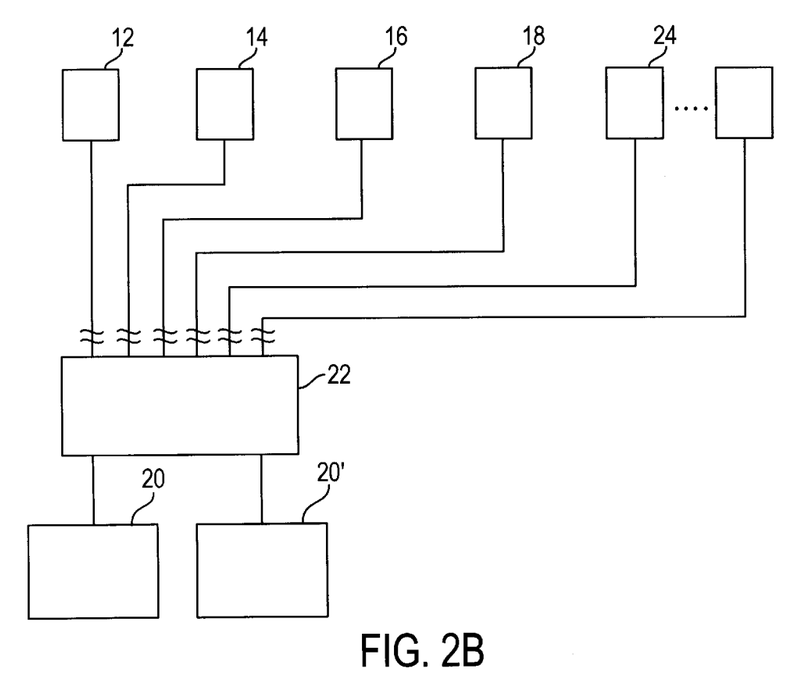
FIG. 2B is a depiction of a data management system incorporating a common data conversion device according to the present invention for a plurality of data generating devices.

Alternatively, the data conversion device 22 may, as illustrated in FIG. 2B be centrally deployed, i.e., at or in the vicinity of the data processing host 20. In the case of FIG. 2B, the data generating devices may be connected directly to the data conversion device 22 or may be so connected via a network.

Figure 3A:
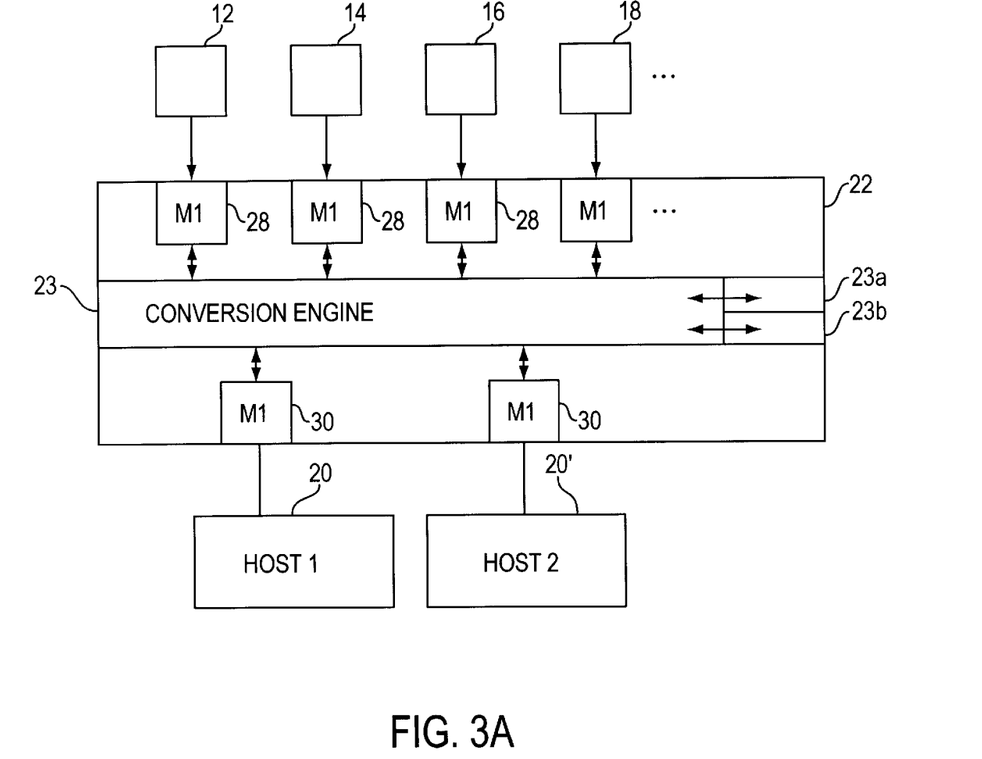
FIG. 3A is a schematic depiction of the architecture of an exemplary data conversion device according to the present invention.

As best seen in FIG. 3A the data conversion device 22 uses a unique message interface (MI) to process each supported record format. When the data conversion device 22 receives a record, the appropriate MI uses a conversion engine 23 embedded in the data conversion device 22 to translate the record data from the input format to a desired Universal Data Format (UDF), which may be an industry specific format. As described in more detail below with reference to FIG. 3B, the conversion engine 23, according to the invention, preferably includes a super-record storage 23a for holding data streams during the conversion processes and, for storage of the data conversion rules applicable to the various message interface devices, a library storage 23b. More specifically, it is the library 23b which contains the conversion rules applicable to the field of UDF(s).

When this conversion is complete, the conversion engine 23 passes control to an output MI 30 that again uses the conversion engine 23 to translate the data from the UDF to a specified output data format. As explained in more detail below, the conversion engine 23 uses separate conversion rules to translate a record from the input format to the UDF and from the UDF to the output format.

As will be understood by one of skill in the art, the conversion engine 23, which is preferably software driven, may operate using any appropriate operating system although the UNIX™ operating system and Sun® workstation platform are presently preferred.

As alluded to above, the data generating devices may be stand alone devices, nodes of a networked system or some combination of both. Although network interface specifications may vary from application to application, it is presently preferred that each conversion device 22 should preferably support a plurality of V.31-type interfaces as well as Ethernet interfaces.

In terms of communications protocols, the conversion engine 23 should preferably support all major communication protocols such as for example TCP/IP (including Telnet and FTP) as well as X.25, Asynchronous and frame relay.

The conversion engine aspect of the invention now be further described with reference to FIG. 3B. As alluded to above, in order to make the transaction engine 23 as flexible as possible, so as to meet the record/transaction conversion needs of as many applications and industries as possible, the method and device for converting or processing records between input and output devices must also be flexible. This is especially important where the number and types of input/output devices is likely to be significant.

This flexibility is preferably accomplished by the following:

Multiple logical interfaces, (MI's) 28 and 30 may easily be installed and supported in the transaction engine. For ease of explanation, only a single such input interface 28 and output interface 30 are depicted in FIG. 3B. Each logical interface 28 and 30 will be unique to a record type to be respectively input to or output from the transaction engine 23. Using different logical interfaces for different record types or data streams allows a user to use only the interface (s) necessary to support a specific application.

All records or data streams input into the transaction engine are converted into a format specific or "known" to the transaction engine i.e., the universal data format (UDF). By converting all data into a specific transaction engine format, a variety of different inputs and output devices can be installed, added, or deleted, without impacting the basic conversion functions of the transaction engine.

The data received is temporarily stored in the super record portion 23b of the transaction engine 23 for subsequent conversion to an output record.

All records output from the transaction engine 23 are converted from the same "known" i.e., universal, data format (UDF). Again, by using a known format as the basis of conversion, different and multiple output record formats can be supported regardless of how the input record was formatted.

As further explained below, the transaction engine 23 processes data bi-directionally so that not only will input data streams be processed, but also communication control records, e.g. acknowledgements, retransmission requests, flow control commands back to the data generating devices will also be processed.

A library of conversion routines is established and used to process a data conversion either from an input data stream to the universal format or from the universal format to the output format. The conversion routines are resident in the library 23a. By using a separate specialized processor for the conversion routines, data stream will be processed most efficiently since only the conversions required will be performed, and the addition and deletion of conversion routines is readily accomplished without impacting the entire transaction engine system.

As explained above, the logical interface that defines the type of record that will either be sent to or sent from the transaction engine 23 is the message interface (MI). The MI not only defines the type of input or output data being handled, it also establishes the conversion rules for a specific type of data record, and the communication controls that will be applied to the input or output data.

The UDF is the definition of all fields maintained within a specific transaction engine. For example, as illustrated in FIG. 3B a UDF may contain a date field that, by definition, always uses a Julian Date format. Received records that contain date fields may use a different format (e.g., MMDDYY), which are always converted into a Julian Date. Output records may also require a date field in a different format (e.g. DDMMMYY), but the date would always be converted from a Julian Date format.

Figure 3B:
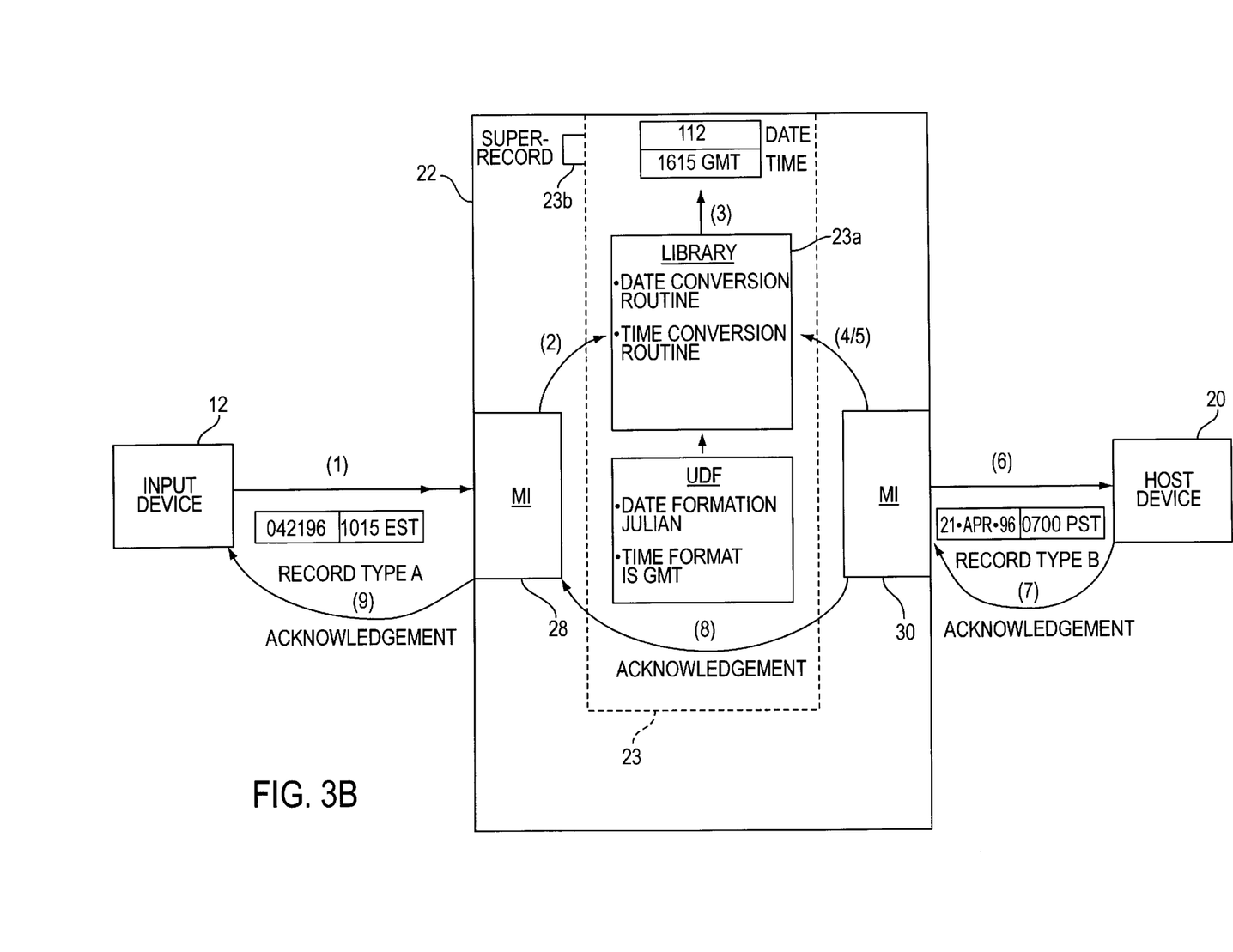
FIG. 3B is a depiction of the relationship between the input and output interface of the data conversion device of FIG. 3A, for explaining the relationship between the input and output interfaces and the library and super record of the conversion engine.

The record that is temporarily stored in the transaction engine (before it is converted to an output record) is referred to as a "super-record" and is stored in the super record 23b in FIG. 3B. The super-record is comprised of fields of data in a format that is defined by the UDF.

The library 23a contains the conversion routines. Examples of conversion routines found in the library 23a are an ASCII-to-EBCDIC routine, or a date conversion routine.

For example, in FIG. 3B, a simple record consisting of date field and a time field is illustrated. Further, in the example of FIG. 3B, it is assumed that the input device 12 requires an acknowledgement from the output or host (data processing) device 20 that a record has been received before it will send a second record. The conversion device operates as follows:

1) A data record from an input device 12 is received by the data conversion device 22. The record is defined as record type (A), and the rules for converting the fields within each record are issued by input MI 28.

2) The conversion routine library 23a is then called on to convert a date field and a time field. The routines in the library 23a will convert the date field and time field to the UDF format.

3) Using the data definitions provided by the UDF, the date and time field are converted into and temporarily stored in the super-record 23b.

4) Subsequently, an output conversion process is initiated by the output MI 30. The output MI 30 defines the output record type (B) and establishes the rules for converting to that record type.

5) The conversion routine library 23a is called on to make the date field and time field conversion.

6) Using the data that has been temporarily stored in the super-record 23b, the conversion to the output record is completed and sent to the host device 20.

7) Once received, the data record is received and the output or host device 20 issues an acknowledgement back to the MI 30 that a record was received and that an additional record may be sent.

8) In this example, the transaction engine 23 does not convert the acknowledgement, but passes it through to the MI 28.

9) Once the acknowledgement is received by the input device, the process repeats itself.

The data conversion process described above, occurs in "real-time".

Table 1 depicts a more general record format that may be supported by an MI. As explained above, the MI defines the data record structure that it recognizes and the conversion rules for the conversion device 22 are applied to transform a data stream. Typically, an MI will preferably support either an input data stream or an output data stream but not both. Input MI's, 28, (referred to below as IMI's) transform an input data stream from the specified input format to the UDF. Output MI's, 30, (referred to below as OMIs) transform a data stream from the UDF to a specified output format(s).

In Table 1, to the right of each message interface component is an example detailing typical contents of that message interface component.

TABLE 1

The Message Interface

| The MI Components | | |
|---|---|---|
| Unique Header | Date and Time | Jan. 01, 1996::083013 |
| | Sequence Number | 015 |
| | Physical/Logical Port | 41::L0 |
| | Protocol | SNA |
| | Encryption | None |
| | Compression | LZH |
| Transaction Record Type | TACACS | |
| Transaction Record Sub-Type | 1) IF Data Field 1 = 'A' AND Data Field 4 = 123.345.567.789 THEN use Transaction Record Structure 'A' | |
| | 2) The value in header field 3 determines the sub-type | |
| | *** | |
| | (<n>) <definition rule> | |
| Transaction Record Structure | Data Field 1 :: Integer | 8 Bytes |
| | Data Field 2 :: ASCII Character | 2 Bytes |
| | *** | |
| | Data Field <n> :: <data type> | <data size> |
| Conversion Rules | Data Field → Data Field 3 (Ø) | |
| | Data Field → Data Field 1 (Julian Date → GMT) | |
| | *** | |
| | Data Field <x> → Data Field <y> (<conversion rule>)) | |

The specific components of the message interface of Table 1 will now be further described.

Header

The conversion engine 23 of the conversion device 22 preferably associates a unique header with each data stream it receives. This header will not only allow the conversion engine to track each data stream back to its origin, but also provide useful information for an audit trail. A typical header should preferably contain:

1) The date and time that the conversion device received the data stream;
2) The physical port of the conversion device that received the data stream;
3) The logical port associated with the data stream;
4) The communication protocol used to receive the data stream;
5) Whether the data stream is compressed or encrypted and, if so, the method used by the sender of the data.

Record Type

The MI record type preferably identifies the class of data streams that the MI processes, in this example TACACS. When the conversion engine recognizes an input data stream format, it routes the data stream to the appropriate MI for processing.

Record Sub-Type

The MI record sub-type is intended, where appropriate, to apportion the record type into sub-classes. If an MI specification requires record sub-types, the conversion engine 23 will preferably examine the record header or data stream to determine the sub-type of the input data stream.

Record Structure

The record structure defines the length of the data record and specifies the field definitions, that is, field length and data type. The conversion engine 23 uses the record structure to properly map and convert the record data fields. If the MI specification includes record sub-types, a separate record structure may exist for each sub-type.

Conversion Rules

The conversion rules instruct the conversion engine 23 how to convert a record to the desired universal format and vice versa. As exemplified in Table 1, the conversion rules may instruct the conversion engine 23 to perform tasks such as the following:

(i) Copy data field 3 in the input record to data field 5 in the converted record;

(ii) Convert the input record time field from Julian Data to GMT;

(iii) Convert the input record status field from ASCII to binary;

(iv) Perform no conversion

In some cases, the conversion engine 23 will receive a compressed input data record. In that case, the conversion engine will preferably examine the input data record header to determine the compression algorithm and the length of the compressed record; and preferably, industry standard algorithms will be used to decompress an input data record before processing and to compress an output data record after processing.

In other cases, the conversion engine 23 may receive an encrypted input record. In that case, it examines the record header to determine the encryption algorithm and the length of the encrypted record. Assuming the input data record uses industry standard algorithms, the input data record is decrypted before processing and then encrypted after processing to create the output data record.

In some cases, input data records may use a different character language than the output record(s). In such cases, the conversion engine 23 preferably converts between such characters, such as for example, packed decimal, ASCII, EBCDIC, and binary characters.

Some other useful functions of the conversion device 22 will now be described:

Padding

Padding a field with blank characters guarantees that the length of the data field will remain constant. The conversion engine 23 preferably right hand justifies and/or left hand justifies, as appropriate, using appropriate characters (e.g., zero's for numerical fields and blanks for character fields).

Truncation

Truncation is preferably used to ensure that data mapping does not inadvertently overwrite the contents of any other data fields when copying the contents of a data field.

"No Conversion" Option

The conversion engine 23 preferably recognizes when not to convert a particular field or an entire record. When combined with UDF definitions (which is a form of data mapping), the "no conversion" option creates three situations:

1) Map the data field and convert the contents of the data field;
2) Map the data field, but do not change the contents of the data field;
3) Do not map and do not change the contents of the data field.

The first two situations address the conversion or non-conversion of specific data fields in the input data record. In both situations, the conversion engine maps a data field from the input data record directly to the output data record. The conversion engine preferably processes all records that fall into any of these situations. In the last situation, however, the conversion engine is not changing the input data record, but is simply passing the input data record to the output port. When an input data record falls into the last situation, the conversion engine 23 does not convert the input data record into the universal format.

The transaction engine provides the ability to redirect the data that IMI 28 receives to the data stream associated with the selected OMI(s) 30. Each IMI 28 "listens" to a physical port for an input data stream in a logical protocol format specified during system configuration. When an IMI 28 receives an input data stream, it converts the record to the universal format based upon the IMI conversion rules. Similarly, the OMI conversion rules are used to convert the universal format to the desired output format(s). In this sense, the conversion engine 23 may be envisioned as essentially operating as a "switch" that routes the converted data to the appropriate physical port(s) associated with the desired OMI(s).

Figure 4:
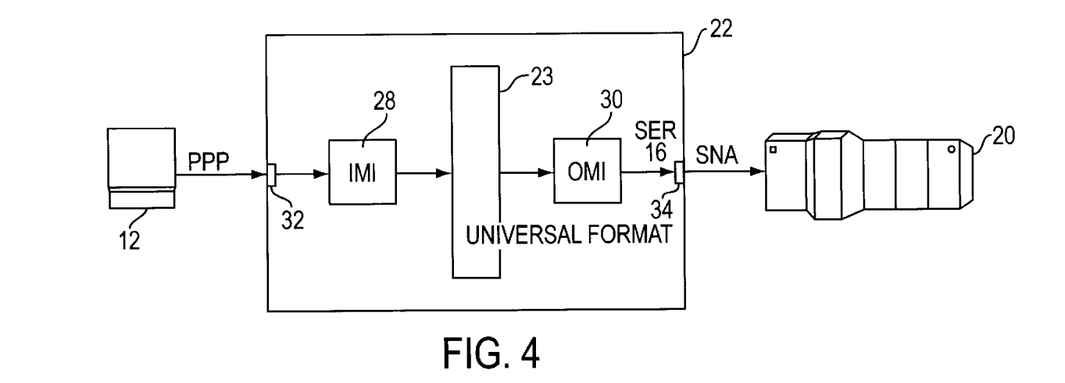
FIG. 4 is a schematic depiction of an exemplary data management system including a data generating device hardwired to a data conversion device.

In the embodiment of FIG. 4, an input device 12 is "hardwired" to an input port 32 (in this case a serial port) of the conversion device 22. The conversion device passes every input data stream that it receives on the input port 32 to the IMI 28 for conversion to the universal data format. The conversion engine 23 senses when the conversion to the universal data format is complete and signals the OMI 30 to convert the data to the desired output data format. The conversion engine 23 routes the converted data to the output port 34 (in this case a serial port). In this embodiment, the output port 32 is preferably "hardwired" to the host device 20.

Figure 5:
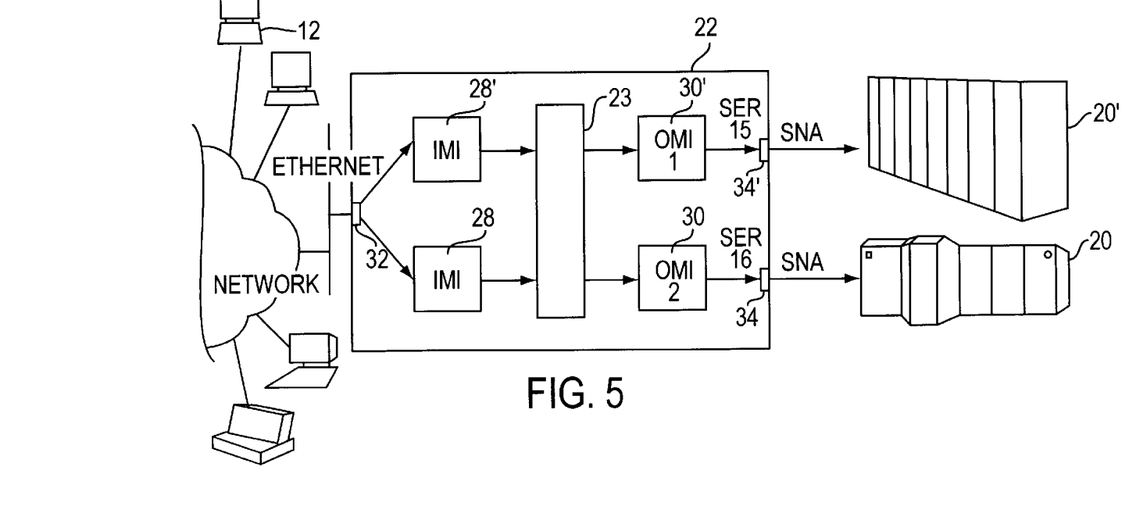
FIG. 5 is a depiction of an exemplary data management system according to the present invention in which a plurality of data generating devices are connected to at least two data conversion devices using a shared port connection.

In the embodiment of FIG. 5, the input devices 12 are nodes of a network 20. Each device 12 has a unique address. The conversion device 22 input receives input data streams from every networked input device 12 through a single connection (e.g., an Ethernet port 32). When the conversion device 22 receives an input data record, it examines the record to determine its origin and direct the appropriate IMI (28 or 28') to convert the input data to the universal format. The conversion engine 23 senses when the conversion to the universal format is complete and signals the appropriate OMI (30 or 30') to convert the data to the desired output format. The conversion engine 23 routes the converted data to the appropriate output port, 34 or 34'. In this embodiment, the output ports 34 and 34' are "hardwired" to the host devices 20 and 20' respectively.

Figure 6:
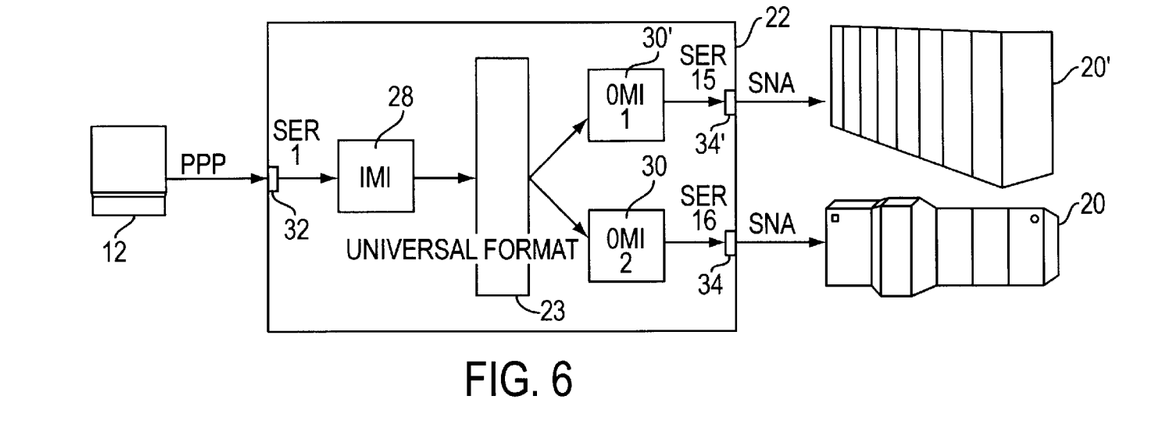
FIG. 6 is a depiction of yet another exemplary embodiment of a data management system according to the present invention in which a data generating device is hard wired to a data conversion device from which data records are distributed to multiple host devices.

The embodiment of FIG. 6 is similar to the embodiment of FIG. 4 in that the input device 12 is "hardwired" to the port 32 of the conversion device 22 (in this example, a serial port). The difference, however, is that the data from this single input device 12 is distributed to multiple host devices 20 and 20'. The conversion device 22 passes every data stream that it receives from the port 32 to the IMI 28 for conversion, by means of the conversion engine 23, to the universal format. The conversion engine 23 senses when the conversion to the universal format is complete and signals the appropriate OMI (30 or 30') to convert the data to its particular output format. The conversion engine 23 then routes the converted data to the appropriate output port(s), 34 and/or 34', each of which is, in the illustrated embodiment, "hardwired" to a host device, 20 and 20' respectively.

Figure 7:
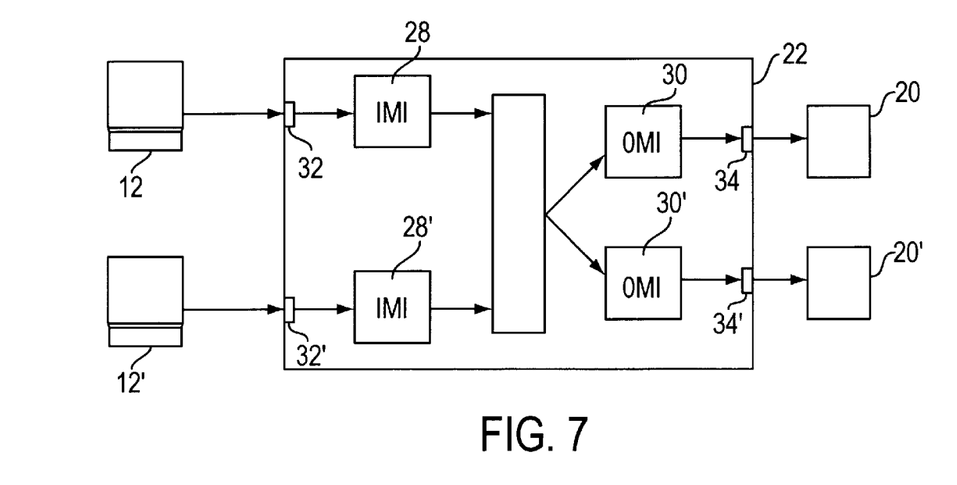
FIG. 7 is a depiction of yet another exemplary embodiment of the invention in which two or more data generating devices are wired to a data conversion device and from which data from each data generator may be distributed to one or to multiple host devices.

In the embodiment of FIG. 7, a plurality, i.e., at least two, input devices 12 and 12', are each connected, via an input port, 32 and 32' respectively, to the IMI 28 and 28' respectively. In this embodiment, the data streams from each of the data generating devices 12 and 12' may be routed to one or more host devices 20 and 20'. The conversion device converts each data stream received at either of the IMI's, 28 or 28', using the conversion engine 23. The conversion engine 23 senses when the conversion to the universal format is complete and then signals the appropriate OMI(s), 30 and/or 30' to convert the data to its particular output format. The conversion engine then routes the converted data to the appropriate output port(s), 34 and/or 34' each of which, in the illustrated embodiment, is wired to a host device, 20 and 20' respectively.

The foregoing description of the preferred embodiments of the invention have been presented for purposes of illustration and description. They are not intended to be exhaustive or to limit the invention to the precise forms disclosed, and obviously many modifications and variations are possible in light of the above teaching. These embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. An information retrieval and storage system comprising:

at least one data generating device for generating a stream of data having a predetermined form of information content, structure and format; a data conversion device for receiving said data stream from said data generating device, converting said data stream into a universal, intermediate form of information content, structure and format, and from the universal intermediate form into a desired output form of information content, structure and format; and for outputting an output data stream; and a host device for receiving said output data stream.

2. The system according to claim 1 further comprising a plurality of data generating devices, each connected to said data conversion device, said data generating devices using diverse forms of information content, structure and format.

3. The system according to claim 2 wherein said plurality of data generating devices are networked and said data conversion device includes a network interface.

4. The system according to claim 2 wherein said data conversion device further comprises at least one data input port and at least one data output port and wherein at least one of data generating devices is hard wired to said input port; and further comprising a host data processing device, said host data processing device being hardwired to said output port.

5. The system according to claim 2 wherein said conversion device comprises one or more discrete devices located remotely from said host device, each of said discrete devices being associated with at least one of said plurality of data generating devices.

6. The system according to claim 2 wherein said data conversion is centrally located in the vicinity of said host device.

7. The system according to claim 1 wherein said data conversion device comprises at least two input data interface devices, each for supporting a different predetermined input data form of information content, structure and format.

8. The system according to claim 7 wherein said input data interface devices convert said predetermined data forms into said intermediate, universal data form.

9. The system according to claim 8 wherein said data conversion device further comprises at least one output interface device, said output interface device being operable to convert data from said intermediate, universal data form into a predetermined output data form.

10. The system according to claim 1 wherein said data conversion device further comprises an input port connected to at least two input data interface devices, and wherein at least two of said plurality of data generating devices are configured as nodes on a network, each of said nodes having a unique address, and wherein said data conversion device receives input data from said networked devices via said inlet port and, based on said unique address, directs said input data to one of said input data interface devices.

11. The system according to claim 10 wherein said data conversion device further comprises at least two output data interface devices, each of said outlet data inface devices being connected to an output port and wherein said data conversion device includes means for directing converted data to an appropriate one of said output data interface devices, said system further comprising at least two host data processing devices, each hard wired to one of said outlet ports.

12. The system according to claim 1 wherein said data conversion device further comprises at least two output data interface devices, each of said outlet data inface devices being connected to an output port and wherein said data conversion device includes means for directing converted data to an appropriate one of said output data interface devices, said system further comprising at least two host data processing devices, each hard wired to one of said outlet ports.

13. The system according to claim 1 wherein said data conversion device further comprises at least one data input port hard wired to said data generating device, and at least two output data interfaces, each connected to an output port, and wherein said data conversion device includes means for directing formatted output data to an appropriate one of said output interface devices, said system further comprising at least two host data processing devices, each hard wired to one of said outlet ports.

14. The system according to claim 13 further comprising a plurality of networked data generating devices connected to said data input port.

15. The system according to claim 1 wherein said data conversion device comprises at least two data input ports and at least two data output ports, each of said input and output ports having an associated interface device and wherein said data conversion device includes means for converting said input data streams into one or more formatted output data streams and directing said formatted output data streams, via an interface device, to one or more of said respective output ports.

16. The system according to claim 1 wherein said data conversion device is located remotely from said host device in the vicinity of said data generating device.

17. A data conversion device for receiving data streams having different forms from a plurality of data generating devices, said conversion device comprising:

(a) at least one input side data interface for receiving an incoming data stream, said input interface supporting a predetermined input form of information content, structure and format;

(b) a data conversion engine for receiving input data from said input data interface having said predetermined form of information content, structure and format and converting said data into intermediate, universal form of information content, structure and format; and (c) at least one output data interface for receiving data in said intermediate universal form of information content, structure and format and outputting said data in a predetermined output form of information content, structure and format.

18. The device according to claim 17 wherein said data conversion device comprises a real-time data conversion device.

19. The device according to claim 17 wherein said data conversion engine includes a record storage means for temporary storage of data streams during conversion and a library of conversion rules for converting input data streams from one or more input forms of information content, structure and format into said intermediate universal form of information content, structure and format and for converting data from said intermediate universal form into one or more output forms of information content, structure and format.

20. A method of processing one or more input data streams having diverse forms of information content, structure and format into one or more output data streams having diverse forms of information content structure and format using a data conversion device comprising the steps of:

receiving a data stream in a first form of information content, structure and format;

converting said data stream in a first interface device into an intermediate, universal form of information contents, structure and format;

converting said data stream in a second interface device from said universal form into a desired output form of information content, structure and format;

transmitting the data stream in said output form to be a data processing device.

21. The method according to claim 20 wherein said conversion steps are bi-directional.

22. An information contents storage and manipulation system including a data converter having a plurality of inputs for receiving data streams representing diverse forms of information content, structure and format and a plurality of outputs for outputting, based on said received data streams, converted data streams representing diverse forms of information content, structure and format, said converter comprising:

one or more input side interfaces for supporting the diverse forms of information content, structure and format received at said at least one input;

one or more output side interfaces for supporting the diverse forms of information content, structure and format to be output at said at least one output;

a conversion engine for performing conversions between each of the input side data streams and output side data streams, said conversion engine including an intermediate record storage for storing data records and a conversion library storage for storing conversion routines, said intermediate record storage holding data converted from one of said diverse forms of information content, structure and format to an intermediate, universal form based on a selected one of said conversion routines until said stored record is converted into a selected one of said diverse output forms of information content, structure and format.

23. The system according to claim 22 wherein said interfaces and said conversion engine are bi-directional.

24. The system according to claim 22 wherein said intermediate, universal form is specific to data for a particular industry.

25. The system according to claim 24 wherein the intermediate, universal data form defines all data fields maintained for said industry.

26. The system according to claim 22 wherein said converter is a real-time data converter.

* * * * *